United States Patent
Flurscheim et al.

(10) Patent No.: US 10,943,225 B2
(45) Date of Patent: Mar. 9, 2021

(54) SYSTEMS AND METHODS FOR INCORPORATING QR CODES

(71) Applicant: Visa International Service Association, San Francisco, CA (US)

(72) Inventors: Christian Flurscheim, Walnut Creek, CA (US); Erick Wong, Vancouver (CA); Oleg Makhotin, Paris (FR)

(73) Assignee: Visa International Service Association, San Francisco, CA (US)

( * ) Notice: Subject to any disclaimer, the term of this patent is extended or adjusted under 35 U.S.C. 154(b) by 118 days.

(21) Appl. No.: 15/921,332

(22) Filed: Mar. 14, 2018

(65) Prior Publication Data

US 2018/0204206 A1 Jul. 19, 2018

Related U.S. Application Data

(63) Continuation of application No. 14/496,905, filed on Sep. 25, 2014, now Pat. No. 9,953,311.

(60) Provisional application No. 61/882,513, filed on Sep. 25, 2013.

(51) Int. Cl.
*G06Q 20/32* (2012.01)
*G06Q 20/38* (2012.01)
*G06K 19/06* (2006.01)

(52) U.S. Cl.
CPC ... *G06Q 20/3276* (2013.01); *G06K 19/06037* (2013.01); *G06K 19/06112* (2013.01); *G06Q 20/3274* (2013.01); *G06Q 20/3821* (2013.01)

(58) Field of Classification Search
CPC ............. G06Q 20/322; G06Q 20/3274; G06Q 20/3276; G06Q 10/02; G06Q 20/00; G06Q 20/204; G06Q 20/20; G06Q 20/3278; G06Q 20/36; G06Q 20/401
See application file for complete search history.

(56) References Cited

U.S. PATENT DOCUMENTS

| | | |
|---|---|---|
| 4,630,201 A | 12/1986 | White |
| 4,934,846 A | 6/1990 | Gilham |
| 5,478,994 A | 12/1995 | Rahman et al. |
| 5,815,657 A | 9/1998 | Williams et al. |
| 6,652,380 B1 | 11/2003 | Luciano |
| 7,047,041 B2 | 5/2006 | Vanska et al. |
| 7,107,078 B2 | 9/2006 | Lehto |
| 7,155,411 B1 | 12/2006 | Blinn et al. |
| 7,312,707 B1 | 12/2007 | Bishop et al. |
| 8,219,490 B2 | 7/2012 | Hammond et al. |

(Continued)

*Primary Examiner* — Peter Ludwig
(74) *Attorney, Agent, or Firm* — Kilpatrick Townsend & Stockton LLP

(57) ABSTRACT

Systems and methods for facilitating payment transactions using quick-response (QR) codes are provided. A first machine readable code encoding first data generated by an access device is scanned by a communication device. The communication device generates a cryptogram based on the first data encoded within the first machine readable code. The communication device then obtains financial credentials data from a payment application being executed on the communication device. A second machine readable code encoding second data comprising the financial credentials data and the cryptogram is then generated. The second machine readable code is displayed on a display of the communication device, wherein the second machine readable code is scanned by the access device.

20 Claims, 8 Drawing Sheets

(56) References Cited

U.S. PATENT DOCUMENTS

| | | | |
|---|---|---|---|
| 8,332,323 | B2 | 12/2012 | Stals et al. |
| 8,346,210 | B2 | 1/2013 | Balsau et al. |
| 8,380,177 | B2 | 2/2013 | Laraccy |
| 8,930,694 | B2 * | 1/2015 | Fernandez de Torres ............... H04L 63/08 713/168 |
| 9,165,294 | B2 * | 10/2015 | Sharma ............ G06Q 20/346 |
| 10,380,583 | B1 * | 8/2019 | Ellis ............ G06Q 20/388 |
| 2001/0051915 | A1 | 12/2001 | Ueno et al. |
| 2002/0169623 | A1 | 11/2002 | Call |
| 2003/0233276 | A1 | 12/2003 | Pearlman et al. |
| 2007/0118483 | A1 | 5/2007 | Hill et al. |
| 2009/0182634 | A1 | 7/2009 | Park et al. |
| 2009/0187492 | A1 | 7/2009 | Hammad et al. |
| 2010/0057619 | A1 | 3/2010 | Weller et al. |
| 2010/0125509 | A1 | 5/2010 | Kranzley et al. |
| 2011/0191161 | A1 * | 8/2011 | Dai ............ G06Q 20/204 705/14.38 |
| 2011/0208658 | A1 | 8/2011 | Makhotin |
| 2011/0238473 | A1 | 9/2011 | Sankolli et al. |
| 2012/0089471 | A1 | 4/2012 | Comparelli |
| 2012/0138679 | A1 | 6/2012 | Doyle |
| 2012/0185317 | A1 | 7/2012 | Wong |
| 2012/0203693 | A1 | 8/2012 | Morgan et al. |
| 2012/0209749 | A1 | 8/2012 | Hammad et al. |
| 2012/0253913 | A1 * | 10/2012 | Richard ............ G06Q 20/363 705/14.27 |
| 2012/0267432 | A1 * | 10/2012 | Kuttuva ............ G06Q 20/223 235/379 |
| 2012/0284130 | A1 | 11/2012 | Lewis et al. |
| 2013/0032634 | A1 * | 2/2013 | McKirdy ............ G16H 40/67 235/375 |
| 2013/0037697 | A1 | 2/2013 | Kato |
| 2013/0048714 | A1 | 2/2013 | Sharma et al. |
| 2013/0075464 | A1 * | 3/2013 | Van Horn ........ G06K 19/06028 235/375 |
| 2013/0246220 | A1 | 9/2013 | Hammad et al. |
| 2013/0256403 | A1 * | 10/2013 | MacKinnon ............ G06Q 20/42 235/375 |
| 2013/0262309 | A1 | 10/2013 | Gadotti |
| 2013/0263238 | A1 | 10/2013 | Bidare |
| 2013/0278622 | A1 | 10/2013 | Sun et al. |
| 2013/0282502 | A1 * | 10/2013 | Jooste ............ G06Q 20/363 705/21 |
| 2014/0019358 | A1 | 1/2014 | Priebatsch |
| 2014/0020073 | A1 | 1/2014 | Ronda |
| 2014/0025538 | A1 | 1/2014 | Avinash et al. |
| 2014/0040617 | A1 * | 2/2014 | Fernandez de Torres ............... H04L 9/3215 713/168 |
| 2014/0054369 | A1 | 2/2014 | Liberty et al. |
| 2014/0074578 | A1 | 3/2014 | Bergdale et al. |
| 2014/0081854 | A1 * | 3/2014 | Sanchez ............ G06Q 20/40 705/40 |
| 2014/0095226 | A1 | 4/2014 | Kourkoumeli et al. |
| 2014/0108263 | A1 | 4/2014 | Ortiz et al. |
| 2014/0129428 | A1 | 5/2014 | Tyler et al. |
| 2014/0156376 | A1 * | 6/2014 | Sellers ............ G06Q 20/3274 705/14.38 |
| 2014/0172531 | A1 | 6/2014 | Liberty et al. |
| 2014/0214665 | A1 | 7/2014 | Lee et al. |
| 2014/0222675 | A1 | 8/2014 | Mao et al. |
| 2014/0236767 | A1 | 8/2014 | Duggal et al. |
| 2014/0249825 | A1 | 9/2014 | Proud |
| 2014/0304094 | A1 | 10/2014 | Reddy et al. |
| 2014/0310174 | A1 | 10/2014 | Heeter |
| 2014/0330656 | A1 * | 11/2014 | Zhou ............ G06Q 20/401 705/16 |
| 2014/0369575 | A1 * | 12/2014 | Riopka ............ G06K 9/00046 382/127 |
| 2014/0379532 | A1 | 12/2014 | Agasti et al. |
| 2015/0032626 | A1 | 1/2015 | Dill et al. |
| 2015/0032627 | A1 | 1/2015 | Dill et al. |
| 2015/0046338 | A1 | 2/2015 | Laxminarayanan et al. |

* cited by examiner

SYSTEMS AND METHODS FOR INCORPORATING QR CODES

CROSS-REFERENCES TO RELATED APPLICATIONS

This application is a continuation application of U.S. patent application Ser. No. 14/496,905, filed on Sep. 25, 2014, which is a non-provisional application of and claims the benefit of priority to U.S. Provisional Application No. 61/882,513, filed on Sep. 25, 2013, which are herein incorporated by reference in their entirety for all purposes.

BACKGROUND

The use of QR codes in payment environments has gained increased attention in the last few years as an alternative to near field communication (NFC) based payment technologies. Many large retailers have already implemented QR code payment environments.

Current QR solutions encode customer financial data and display the corresponding QR codes on the user's communication device to scan at a POS terminal. However, the QR codes can be copied by fraudsters and can be replayed at other POS terminals, thereby creating security risks.

It would be desirable to provide for a payment method that can utilize machine readable codes, while improving transaction security. Embodiments of the invention address this and other problems, individually and collectively.

BRIEF SUMMARY

In some embodiments of the invention, a systems and methods for incorporating QR codes in payment transactions are provided. The systems and methods provide a platform that can be leveraged by various entities such as third party wallet providers, merchants, acquirers, payment processors, etc. that use QR codes to facilitate payment transactions. In the QR code based system, an access device can generate a QR code at the time of the payment transaction. The generated QR code can encode various data pertinent to the transaction, such as the transaction amount, a merchant identifier, a random number, and/or any relevant coupon data. A user may scan the generated code with his/her communication device and the communication device may in turn generate another QR code based on a cryptogram, financial data associated with the user, and the random number decoded from the access device generated QR code. The communication device generated QR code can be scanned at the access device and the access device can format the relevant data from the QR code into a standard authorization request message to be sent to an issuer.

One embodiment of the invention is directed to a method comprising scanning, via a communication device, a first machine readable code encoding first data generated by an access device. The method also includes generating, via the communication device, a cryptogram based on the first data encoded within the first machine readable code. The method further includes obtaining, via the communication device, financial credentials data from a payment application being executed on the communication device. The method additionally includes generating, via the communication device, a second machine readable code encoding second data comprising the financial credentials data and the cryptogram. The method further includes displaying on a display of the communication device the second machine readable code, wherein the second machine readable code is scanned by the access device.

In some embodiments, the first data comprises at least one of a transaction amount, a random number, or coupon data.

In some embodiments, the first machine readable code is displayed on a display of the access device.

In some embodiments, obtaining the financial credentials from the secure application comprises communicating the first data encoded within the first machine readable code to the secure application and obtaining the financial credentials from a secure element within the communication device.

In some embodiments, the financial credentials data comprises a token associated with a primary account number (PAN).

In some embodiments, obtaining the financial credentials data comprises obtaining the financial credentials data from a server computer.

In some embodiments, the access device is a point-of-sale (POS) device.

In some embodiments, the secure application is a digital wallet application associated with a digital wallet provider.

In some embodiments, the first machine readable code and the second machine readable code are quick response (QR) codes.

In some embodiments, the second data further comprises biometric data associated with a user of the communication device.

Other embodiments of the invention are directed to communication devices, servers, and systems that are configured to perform the above-described methods.

These and other embodiments of the invention are described in further detail below.

DETAILED DESCRIPTION

Figure 1:
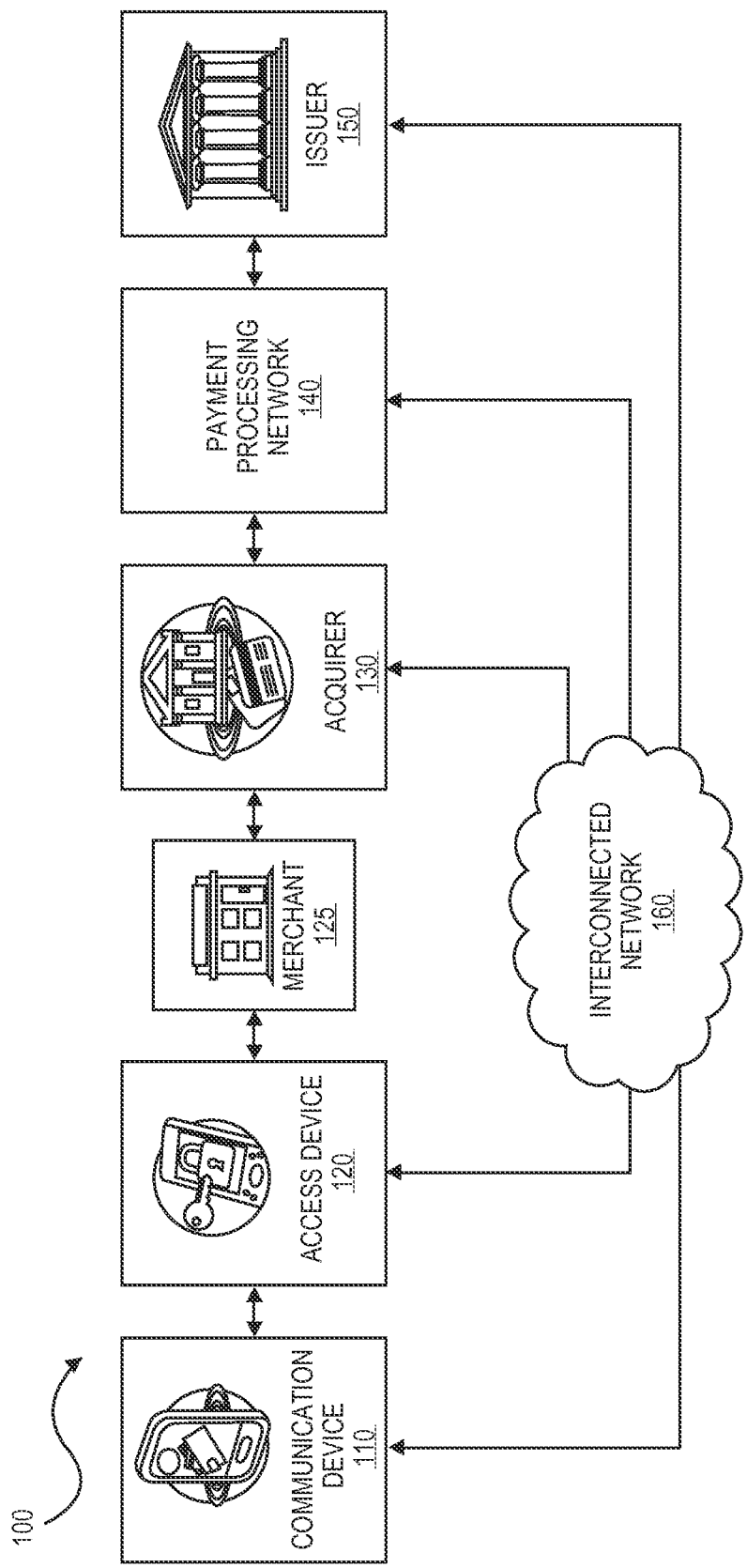
FIG. 1 shows a block diagram of a typical transaction processing system for electronic payment transactions using issuer accounts, in accordance with some embodiments of the invention.

Embodiments are directed at systems, methods, and devices for using QR codes in payment transactions. As explained above, QR codes can encode financial transaction data and other transaction security data. A QR code can be used to initiate transaction activity. Two-way communication using QR codes can also improve transaction security.

Prior to discussing embodiments of the invention, descriptions of some terms may be helpful in understanding embodiments of the invention.

A "token" may include any identifier for a payment account that is a substitute for an account identifier. For example, a token may include a series of alphanumeric characters that may be used as a substitute for an original account identifier. For example, a token "4900 0000 0000 0001" may be used in place of a primary account identifier or primary account number (PAN) "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Authentication" is a process by which the credential of an endpoint (including but not limited to applications, people, devices, processes, and systems) can be verified to ensure that the endpoint is who they are declared to be.

An "original" transaction may include any transaction including an authorization provided by an issuer or an authorization provided on-behalf-of an issuer.

A "substitute" transaction may be any transaction that is associated with an original transaction and that takes place after the original transaction, including repeat, refunds, reversals or exceptions (chargebacks, re-presentments, etc.).

An "end-user" may include any application, device, consumer, or system that is configured to interact with a requestor for tokenization/de-tokenization/token management services. For example, an end-user may include a consumer, a merchant, a mobile device, or any other suitable entity that may be associated with a requestor in the network token system.

A "consumer" may include an individual or a user that may be associated with one or more personal accounts and/or consumer devices. The consumer may also be referred to as a cardholder, accountholder, or user.

A "card-on-file (COF)" holder may include any entities that store account details (e.g., card details, payment account identifiers, PANs, etc.) for use in transactions. For example, a COF entity may store payment information on file for various types of periodic payments such as monthly utility payments, periodic shopping transactions, or any other periodic or future transaction. Because payment credentials and/or associated tokens are stored at an entity for a future transaction, the transactions initiated by a COF entity include card-not-present (CNP) transactions. Another type of card-not-present (CNP) transaction includes e-commerce or electronic commerce transactions that are initiated between remote parties (e.g., a consumer device and a merchant web server computer).

An "authorization request message" may be an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or a payment account. In some embodiments of the invention, an authorization request message may include a payment token, an expiration date, a token presentment mode, a token requestor identifier, an application cryptogram, and an assurance level data. The payment token may include a payment token issuer identifier that may be a substitute for a real issuer identifier for an issuer. For example, the real issuer identifier may be part of a BIN range associated with the issuer. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include an authorization code, which may be a code that a credit card issuing bank returns in response to an authorization request message in an electronic message (either directly or through the payment processing network) to the merchant's access device (e.g. POS terminal) that indicates approval of the transaction. The code may serve as proof of authorization. As noted above, in some embodiments, a payment processing network may generate or forward the authorization response message to the merchant.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer.

"Machine readable code" can be any encoded image readable by a communication device or any other computing device. The machine readable code can be read by a device by, e.g., scanning the code with a camera device that is part of, or attached to, the device. Examples of machine readable code including quick response codes and SnapTags.

A "quick response" code or "QR code" may be a matrix barcode and a type of machine readable code that contains information (e.g., information pertaining to a payment transaction). A typical QR code may use four standardized encoding modes (numeric, alphanumeric, byte/binary, and kanji) to efficiently store data.

A "cryptogram" may be a uniquely signed digital payload associated with a primary account number (PAN) or token. The cryptogram may uniquely identify the device that emulated the payment card and is a form of validation. The cryptogram may be uniquely generated for every payment transaction.

"Financial credentials" can include a PAN, token, or any other representation that identifies a payment account associated with a user.

A "secure element" can be a dynamic environment in which application code and application data can be securely stored and administered and which secure execution of applications occur. The secure element can reside in highly secure crypto chips. The financial credentials can be stored within the secure element.

An "access device" can be any point that enables a customer makes a payment to a merchant in exchange for goods or services. An access device can be any equipment including hardware, software, or a combination thereof, that can be used to initiate a transfer of funds. An example of an access device is a point-of-sale (POS) device or a communication device.

"Biometric data" includes data that can be used to uniquely identify an individual based upon one or more intrinsic physical or behavioral traits. For example, biometric data may include fingerprint data and retinal scan data. Further examples of biometric data include digital photographic data (e.g., facial recognition data), deoxyribonucleic acid (DNA) data, palm print data, hand geometry data, and iris recognition data, A "digital wallet provider" may include any suitable entity that provides a digital wallet service. A digital wallet provider may provide software applications that store account numbers, account numbers including unique identifiers, or representations of the account numbers (e.g., tokens), on behalf of an account holder to facilitate payments at more than one unrelated merchant, perform person-to-person payments, or load financial value into the digital wallet.

"Contactless" or "wireless" can include any communication method or protocol, including proprietary protocols, in which data is exchanged between two devices without the need for the two devices to be physically coupled. For example, "contactless" or "wireless" can include radio frequency (RF), infrared, laser, or any other communication means, and the use of any protocols, such as proprietary protocols, with such communication means.

I. Exemplary Systems

FIG. 1 shows a block diagram of a typical transaction processing system 100 configured to use real issuer identifiers (e.g., bank identification numbers (BINs)) to route authorization request messages during transaction processing. For example, payment credentials issued for consumers may include real issuer identifiers (e.g., BINs) that may be used to identify the issuer (and payment processing network) associated with the account being used to initiate the transaction.

The system 100 may include a communication device 110, an access device 120, a merchant computer 125, an acquirer computer 130, a payment processing network computer 140 and an issuer computer 150. In some implementations, different entities in FIG. 1 may communicate with each other using one or more communication networks such as the Internet, a cellular network, a TCP/IP network or any other suitable communication network. Note that one or more entities in the system 100 may be associated with a computer apparatus that may be implemented using some of the components as described with reference to FIG. 7.

The communication device 120 may be associated with a payment account of a user. In some implementations, the communication device 120 may be a mobile device such as a mobile phone, a tablet, a PDA, a notebook, a key fob or any suitable mobile device. For example, the communication device 120 may include a wallet or a payment application that may be associated with one or more payment accounts of the user. In some implementations, the communication device 120 may be configured to display a machine readable code (e.g., QR™ code, bar code, etc.). The communication device 120 may also include a camera or a scanning device capable of scanning a machine readable code. In some implementations, the communication device 120 may be capable of communicating with the access device 120 using a short range communication technology such as NFC. For example, the communication 110 may interact with the access device 130 by tapping or waving the consumer device 120 in proximity of the access device 130. In some implementations, the communication device 120 may be a payment card such as a credit card, debit card, prepaid card, loyalty card, gift card, etc.

The access device 120 may be an access point to a transaction processing system that may comprise the acquirer computer 130, the payment processing network computer 140, and the issuer computer 150. In some implementations, the access device 120 may be associated with or operated by the merchant computer 125. For example, the access device 120 may be a point of sale device that may include a contactless reader, an electronic cash register, a display device, etc. In some implementations, the access device 120 may be configured to display transaction information in a format that may be read by the communication device 110 (e.g., mobile phone) including a QR™ code, bar code, or any other information transfer mechanism. In some implementations, the access device 120 may be a personal computer that may be used by the user to initiate a transaction with the merchant computer 125 (e.g., an online transaction).

The merchant computer 125 may be associated with a merchant. In some embodiments, the merchant computer 125 may be associated with a card-on-file (COF) merchant. For example, the card-on-file merchant may store consumer account information on file (e.g., at a merchant database) for future payment purposes such as various types of periodic payments (e.g., monthly utilities payments). In some implementations, a consumer may register with one or more merchants for card-on-file services. The merchant computer 125 may be configured to generate an authorization request for a transaction initiated by the user using the access device 120.

The acquirer computer 130 may represent a traditional acquirer/acquirer processor. The acquirer is typically a system for an entity (e.g., a bank) that has a business relationship with a particular merchant, a wallet provider or another entity. The acquirer computer 130 may be communicatively coupled to the merchant computer 125 and the payment processing network 140 and may issue and manage a financial account for the merchant. The acquirer computer 130 may be configured to route the authorization request for a transaction to the issuer computer 150 via the payment processing network computer 140 and route an authorization response received via the payment processing network computer 140 to the merchant computer 125.

The payment processing network computer 140 may be configured to provide authorization services, and clearing and settlement services for payment transactions. The payment processing network computer 140 may include data processing subsystems, wired or wireless networks, including the internet. An example of the payment processing network computer 140 includes VisaNet™, operated by Visa®. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. The payment processing network computer 140 may include a server computer. In some implementations, the payment processing network computer 140 may forward an authorization request received from the acquirer computer 130 to the issuer computer 150 via a communication channel. The payment processing network computer 140 may further forward an authorization response message received from the issuer computer 150 to the acquirer computer 130.

The issuer computer 150 may represent an account issuer and/or an issuer processor. Typically, the issuer computer 150 may be associated with a business entity (e.g., a bank) that may have issued an account and/or payment card (e.g., credit account, debit account, etc.) for payment transactions. In some implementations, the business entity (bank) associated with the issuer computer 150 may also function as an acquirer (e.g., the acquirer computer 130).

The various entities in the system 100 may communicate with each other via an interconnected network 160, e.g., the Internet.

Figure 2:
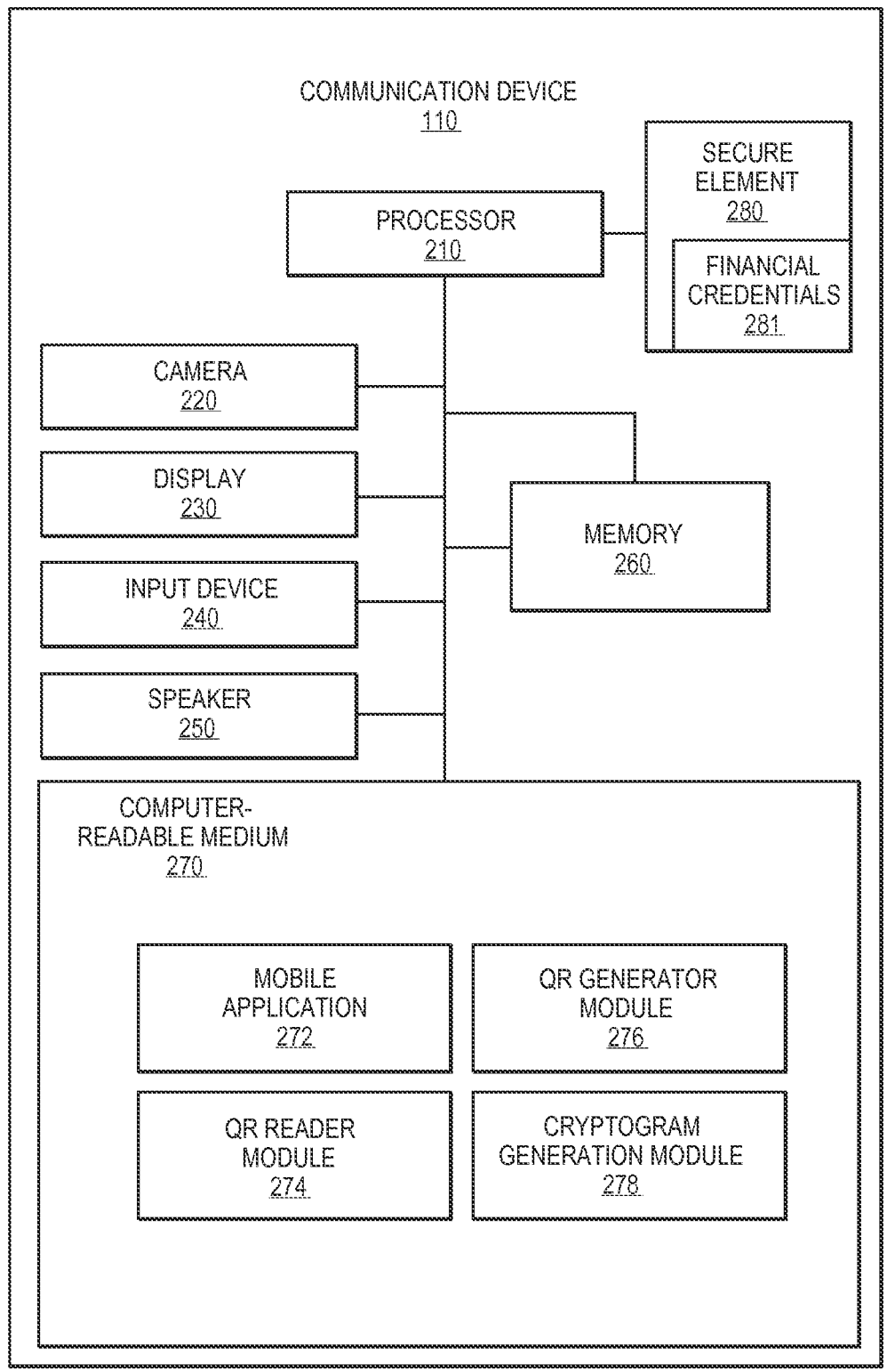
FIG. 2 shows a block diagram of a communication device, in accordance with some embodiments of the invention.

FIG. 2 shows a block diagram of a communication device, in accordance with some embodiments of the invention. Communication device 110 includes a processor 210, a camera 220, a display 230, an input device 240, a speaker 250, a memory 260, a computer-readable medium 270, and a secure element 280.

Processor 210 may be any suitable processor operable to carry out instructions on the communication device 110. The processor 210 is coupled to other units of the communication device 110 including camera 220, display 230, input device 240, speaker 250, memory 260, and computer-readable medium 270.

Camera 220 may be configured to capture one or more images via a lens located on the body of communication device 110. The captured images may be still images or video images. The camera 220 may include a CMOS image sensor to capture the images. Various applications (e.g., mobile application 272) running on processor 210 may have access to camera 220 to capture images. It can be appreciated that camera 220 can continuously capture images without the images actually being stored within communication device 110. Captured images may also be referred to as image frames. In some embodiments, camera 220 may be configured to capture images of a machine readable code, e.g., a QR code.

Display 230 may be any device that displays information to a user. Examples may include an LCD screen, CRT monitor, or seven-segment display.

Input device 240 may be any device that accepts input from a user. Examples may include a keyboard, keypad, mouse, or microphone. In the case of a microphone, the microphone may be any device that converts sound to an electric signal. In some embodiments, the microphone may be used to capture one or more voice segments from a user.

Speaker 250 may be any device that outputs sound to a user. Examples may include a built-in speaker or any other device that produces sound in response to an electrical audio signal. In some embodiments, speaker 250 may be used to request the user for a voice sample for purposes of authentication.

Memory 260 may be any magnetic, electronic, or optical memory. It can be appreciated that memory 260 may include any number of memory modules. An example of memory 260 may be dynamic random access memory (DRAM).

Computer-readable medium 270 may be any magnetic, electronic, optical, or other computer-readable storage medium. Computer-readable storage medium 270 includes voice data capture module 272 and voice data transmission module 274. Computer-readable storage medium 270 may comprise any combination of volatile and/or non-volatile memory such as, for example, buffer memory, RAM, DRAM, ROM, flash, or any other suitable memory device, alone or in combination with other data storage devices.

Mobile application 272 can be any application executable by processor 210 on the communication device 110. In some embodiments, the mobile application 272 can be a secure application for facilitating payment transactions using the communication device 110. For example, the mobile application 272 can be a digital wallet application. The mobile application 272 can interface with the secure element 280 to obtain the financial credentials 281 associated with the user. The mobile application 272 may contain, but is not limited to, the following core pieces: (1) a payment library including code for enabling payments including selecting and presenting the secure element 280 to the access device 120; (2) a proxy applet managed by a service provider that manages secure communications between the secure element 280 and a trusted service manager to execute account provisioning and account management commands; and (3) a contactless gateway library that includes code for enabling secure communication between the secure element 10(b) and a payment processor's contactless gateway.

QR reader module 274 may be configured to read and interpret a QR code. The QR reader module 274 may interface with camera 220 to capture or "scan" a presented QR code on e.g., an access device. Upon capturing or scanning the presented QR code, the QR reader module 274 can interpret the QR code and convert it to useful information. For example, the QR reader module 274 can interpret a QR code scanned off an access device and determine the relevant transaction information associated with the transaction (e.g., payment amount, merchant information, coupon information, random number, etc.).

QR generator module 276 may be configured to generate a QR code. The QR generator module 276 may interface with the mobile application 272 and cryptogram generation module 278 to generate a QR code that can be scanned by an access device. For example, the generated QR code can include the financial credentials 281 (as obtained by the mobile application 272), a cryptogram generated by the cryptogram generation module 278, and any other information pertinent to a payment transaction.

Secure element 280 may be a secure, tamper-resistant, storage and execution environment that various payment assets such as financial credentials 281. The secure element 280 can act as a contactless front end by using a communication channel with the mobile application 272. The secure element 280 may be composed of a combination of an integrated circuit and an operating system. The secure element 280 may also contain a secure applet that may be selected by the access device 120 and presents any available mobile contactless payment information to the access device 120.

Figure 3:
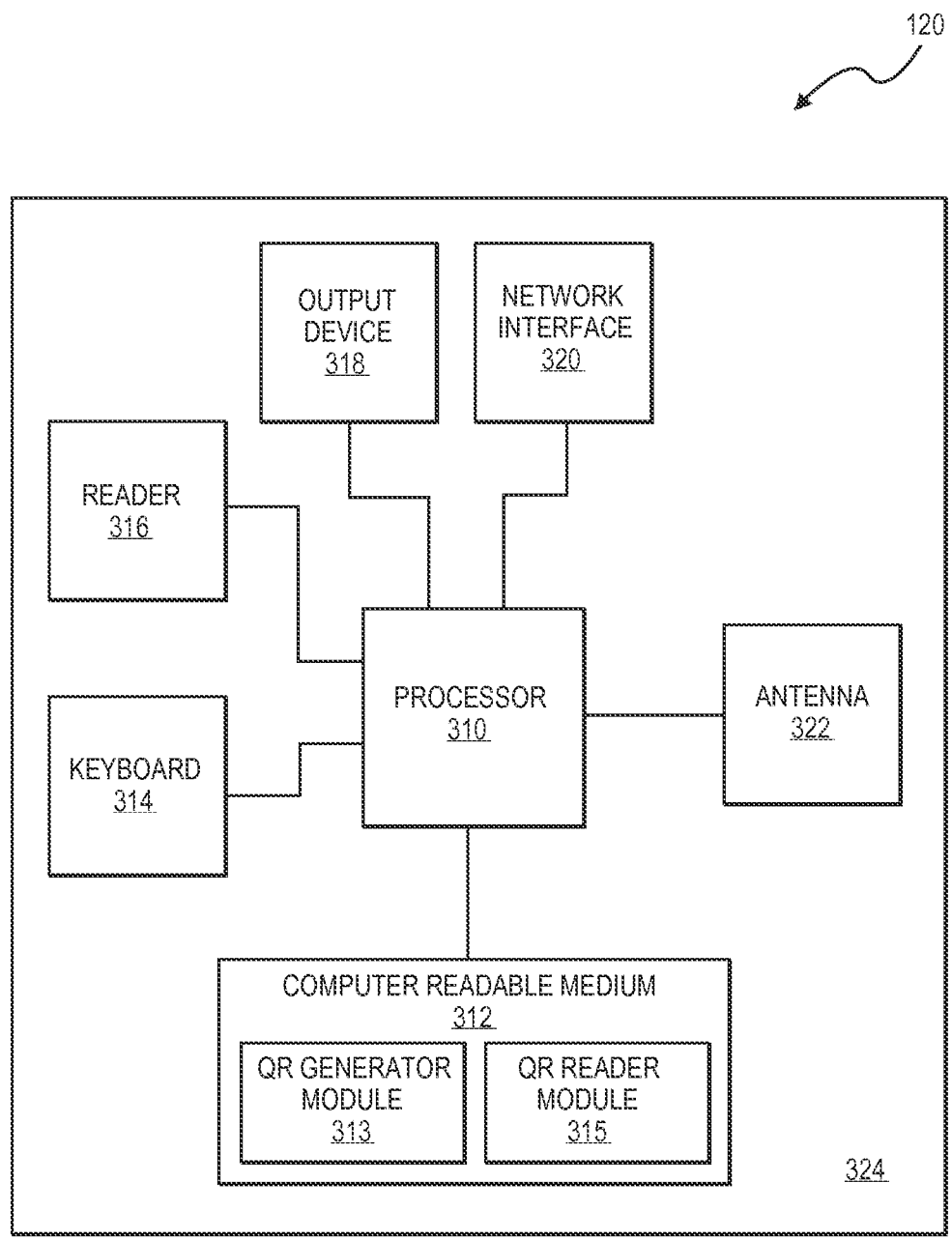
FIG. 3 shows a block diagram of an access device, in accordance with some embodiments of the invention.

FIG. 3 shows a block diagram of an access device 120, in accordance with some embodiments of the invention. Access device 120 may comprise a processor 310. It may also comprise a computer-readable medium 312, a keypad 314, a magnetic strip reader 316, an output device 318, a network interface 320, and an antenna 322. All of these elements may be operatively coupled to processor 310. A housing 324 may also house one or more of these components.

Computer-readable medium 312 may include one or more memory chips, disk drives, etc. Computer-readable medium 312 may store code or instructions for allowing merchant access device 300 to operate in the manner described herein.

The instructions may be executed by processor 310. The computer-readable medium 312 may include one or more memory chips, disk drives, etc. Computer-readable medium 312 may store code or instructions for allowing access device 120 to operate in the manner described herein. The instructions may be executed by processor 310. Computer-readable medium 312 may further comprise any suitable modules.

QR generator module 313 may be configured to generate a QR code. The QR code may be generated by the QR generator module 313 and displayed via output device 318 on the access device 120. The displayed QR code may be read or "scanned" by communication device 110. The generated QR code may include information pertinent to the payment transaction, e.g., transaction amount, merchant identification, coupon data, item information, etc.

QR reader module 315 may be configured to read and interpret a QR code displayed on communication device 110. For example, the QR reader module 315 can interpret a QR code scanned off communication device 110 and determine the payment information relevant to the transaction (e.g., PAN or token, cryptogram, etc.).

Keypad 314 may be operable to input information such as transaction information into access device 120. Magnetic strip reader 316 may be operable to read information from a magnetic strip of a card such as a credit or a debit card. Output device 318 may include a display. The display may display, for example, transaction information. Network interface 320 may be operable to enable access device 120 to communicate with other system entities. For example, it may enable access device 120 to communicate with one or more of acquirer 130, payment processing network 140, and issuer 150. Antenna 322 may be provided to enable access device 120 to operate remotely.

II. Transactions Incorporating QR Codes

Figure 4:
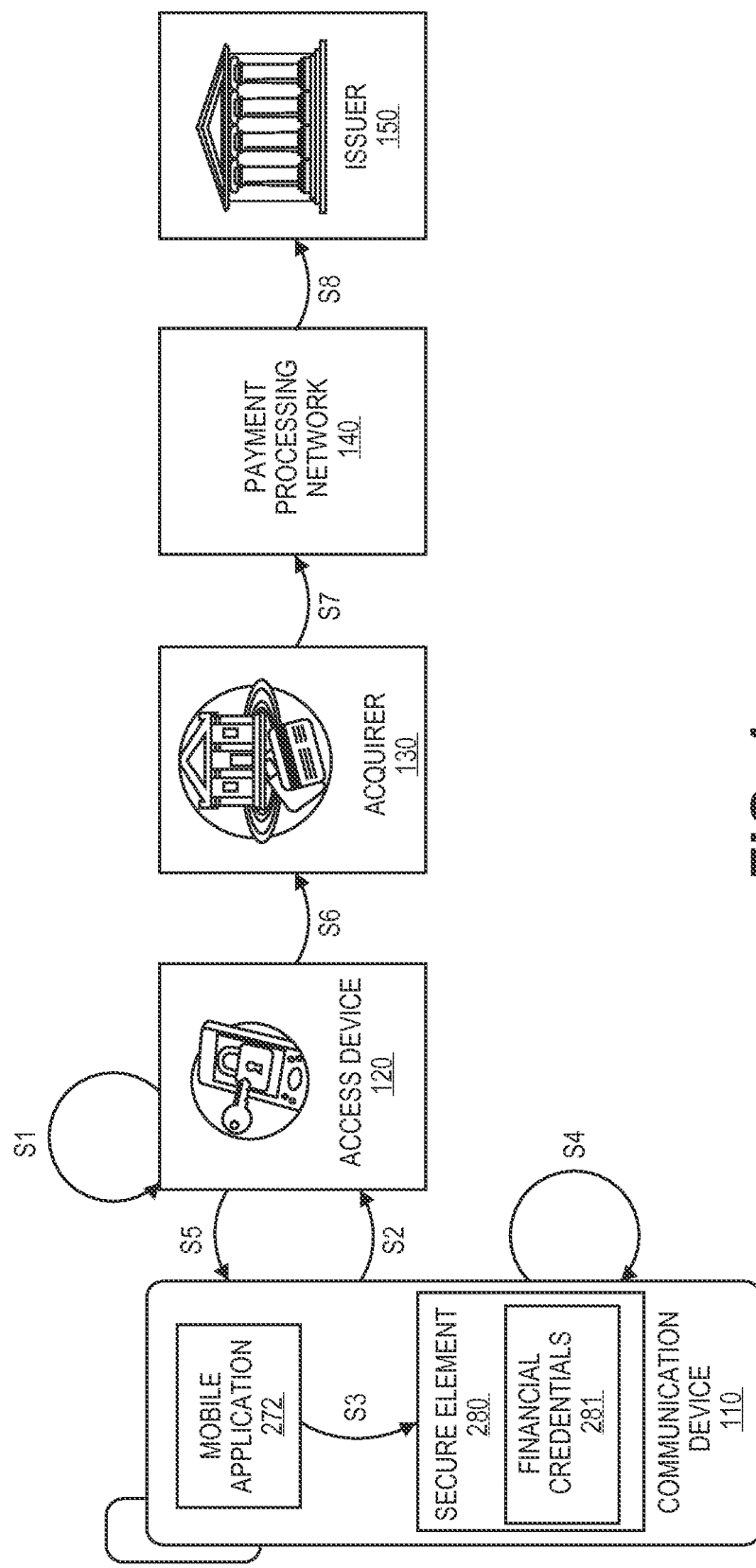
FIG. 4 shows a flow diagram for an exemplary flow for a payment transaction including the use of a machine readable code, in accordance with some embodiments of the invention.

FIG. 4 shows a flow diagram for an exemplary flow for a payment transaction including the use of a machine readable code, in accordance with some embodiments of the invention. In some embodiments, the communication device 110 may use a mobile application 272 to generate, via QR generator module 276, a QR code based on a real primary account number (PAN) with a full cryptogram and a scanned QR code that was generated on an access device 120 to trigger a payment transaction. This allows for generation of a full cryptogram without any interaction with the access device 120.

At step s1, upon a user indicating that he/she wishes to conduct a payment transaction at an access device 120 using a QR code, the access device checkout system may begin by the access device 120 generating a QR code to trigger payment. The user may indicate his/her wishes to conduct a payment transaction by executing the mobile application 272 on the communication device 110. The user may instruct the mobile application 272 to begin the payment transaction process or the mobile application 272 may automatically detect the presence of the access device 120 (e.g., using NFC). The QR code may be generated by QR generator module 313 of access device 120. The generated QR code may be based on, for example, transaction amount, a random number, optional coupon data, or any other variable data upon the user approaching the access device 120 to initiate checkout. Upon the QR generator module 313 generating the appropriate QR code, the generated QR code may be displayed on a display of the access device 120.

At step s2, the user may scan the QR code generated by the access device 120 that is displayed on a display of the access device 120, with communication device 110. The scanning may be accomplished via a camera or scanner internal to communication device 110. The communication device 110 may decode the information encoded in the scanned QR code via mobile application 272 interfacing with the QR reader module 274, as described above. The information may include transaction amount, a random number, optional coupon data, or any other variable data. The random number may be unique to each transaction and serve as a fraud prevention mechanism, described in further detail below. The communication device 110 may display a confirmation for a successful scan or an error message for an unsuccessful scan.

At step s3, the mobile application 272 running on the communication device 110 may interface with the secure element 280 to obtain the user's financial credentials 281. As described above, the financial credentials may be securely stored within the secure element 280 on the communication device 110. In some embodiments, the mobile application 272 may have exclusive access to the secure element 280.

At step s4, the decoded information from the scanned QR code may be used to generate a cryptogram. That is, the cryptogram may be generated based on the decoded transaction amount, random number, optional coupon data, or any other variable data in the QR code. The cryptogram may also be generated using any suitable encryption algorithm including DES, triple DES, and AES. Since the random number is uniquely generated by the access device 120 for each payment transaction, the cryptogram generated by the communication device 110 may also be unique for each transaction. The cryptogram may be generated by cryptogram generation module 278 of the communication device 110. Accordingly, the cryptogram would be difficult for a fraudster to duplicate because of the various data that is uniquely generated for each transaction. Even if a fraudster were to steal the cryptogram, any attempt by the fraudster to use the cryptogram would likely fail as the random number that the cryptogram was generated based on may be different in a subsequent transaction.

In some embodiments, the cryptogram may also be generated based on geolocation data. For example, the cryptogram can be generated based on a location where the user is conducting the payment transaction. The use of geolocation in generating the cryptogram may add yet another layer of security. If a fraudster were to steal the cryptogram, any use of the cryptogram may be unsuccessful as it will not be authenticated in a location other than the one for which it was generated.

In some embodiments, the cryptogram may also be generated based on a timestamp of the attempted transaction. The use of a timestamp in generating the cryptogram may add yet another layer of security for reasons similar to those described above.

In some embodiments, the cryptogram may also be generated based on device specific information of the communication device 110. The use of device specific information of the communication device 110 may add yet another layer of security for reasons similar to those described above.

In some embodiments, the cryptogram may also be generated based on biometric data of the user. For example, the user may provide a thumbprint, retinal scan, voice sample, etc. to the communication device 110 at the time of the transaction. The cryptogram may be generated based on this received biometric data. The use of biometric data unique to the user may add yet another layer of security for reasons similar to those described above.

Additionally, at step s4, the communication device 110 may combine the cryptogram and the obtained financial credentials 281. The combination may then be encoded into a QR code generated by the communication device 110. The QR code may be generated by the mobile application 272 via the QR generator module 276 of the communication device 110. The QR code generated by the communication device 110 may then be displayed on a display of the communication device 110.

At step s5, the user may point the communication device 110 at the access device 120 such that the access device 120 can scan the QR code generated by the communication device 110 in step s4. The access device 120 may then scan the QR code displayed on the communication device 110 using an internal camera or sensor to the access device 120. The access device 120 may display a confirmation for a successful scan or an error message for an unsuccessful scan.

At step s6, the access device 120 may decode the scanned QR code and convert the information within the QR code to a standard purchase authorization message. The purchase authorization message may include, but is not limited to, the financial credentials, cryptogram, transaction amount, coupon data, random number, etc. The standard authorization request message may be forwarded to the acquirer 130 for standard processing and further onward to the issuer 150 for purchase authorization (via the payment processor network 140) (steps s7 and s8).

By employing a secure element to store the user's financial credentials 281 and using the credentials along with a combination of QR codes to register a payment a transaction, the system described in FIG. 4 allows for a more secure method of using QR codes for card not present payment transactions. The concept of QR code generation by both the communication device 110 and the access device 120 allows for two-way communication between the two using QR codes, which is inherently more secure than a simple one-way communication.

In some embodiments, the system described in FIG. 4 may use a remote trusted execution environment instead of the secure element 280. That is, the mobile application 272 may emulate the payment card to provide the financial credentials needed to generate the QR code.

In some embodiments, the QR code can include a country code and/or currency code for pertaining to the transaction. In some embodiments, the QR code generated by the mobile device can include a digital signature of the mobile device. In some embodiments, the QR code generated by the mobile device can include a device fingerprint. In some embodiments, the QR code generated by the access device can include a device fingerprint.

Figure 5:
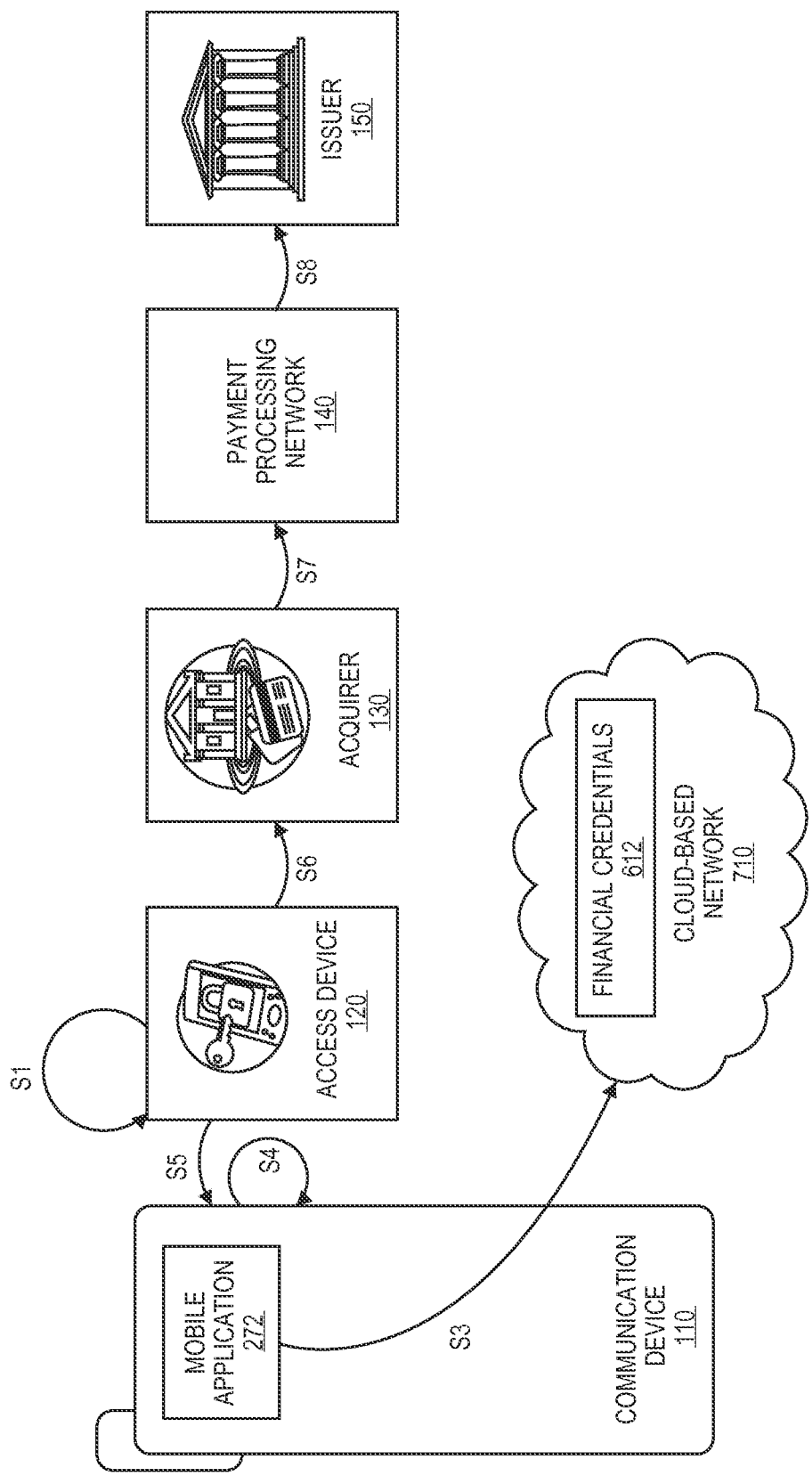
FIG. 5 shows a flow diagram for another exemplary flow for a payment transaction including the use of a machine readable code, in accordance with some embodiments of the invention.

FIG. 5 shows a flow diagram for another exemplary flow for a payment transaction including the use of a machine readable code, in accordance with some embodiments of the invention. FIG. 5 is similar to FIG. 4, however FIG. 5 illustrates the use of a cloud-based network 710 that stores the financial credentials 612 associated with the user. After performing steps s1 and s2 described in FIG. 4, in some embodiments, instead of instead of obtaining the user's financial credentials from the secure element 280, the communication device may obtain the user's financial credentials 612 from the cloud-based network 710 (or a server computer in the cloud-based network 710) at step s3.

In some embodiments, the server computer in the cloud-based network 710 may be associated with a digital wallet provider. Additionally, the digital wallet provider may also be associated with the mobile application 272. Accordingly, the mobile application 272 may be a digital wallet application that provides a front-end for the user to interact with the digital wallet provider. The use may enroll various payments cards with the digital wallet provider via the mobile application 272. Upon each transaction, the mobile application 272 may communicate with the cloud-based network 710 to obtain the financial credentials 612 for the particular transaction. In some embodiments, various data pertaining to the cloud-based network 710 may be used to generate the cryptogram, in addition to the data described above.

After obtaining the financial credentials 612 from the cloud-based network 710, the process flow described in FIG. 5 may continue similar to the process flow described with respect to FIG. 4 (e.g., steps s4-s8).

Figure 6A:
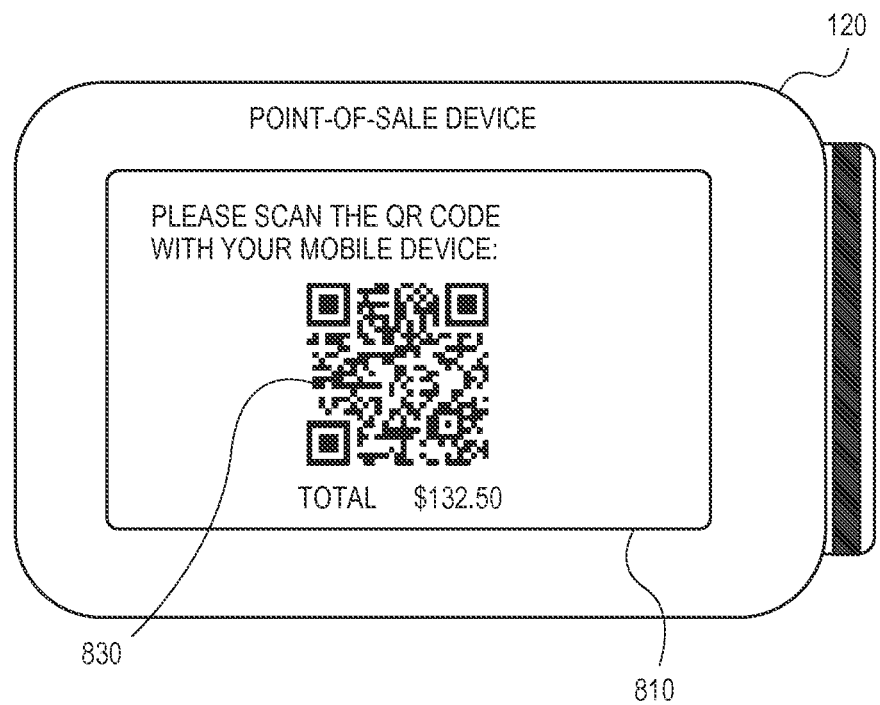
FIG. 6A shows an access device displaying a QR code usable in a payment transaction, in accordance with some embodiments of the invention.

FIG. 6A shows an access device 120 displaying a QR code 830 usable in a payment transaction, in accordance with some embodiments of the invention. The access device 120 may include a display device 810 configured to display the QR code 830 and various other prompts to the user. As described with respect to steps s1 and s2 in FIG. 4, the access device 120 may generate a QR code encoding various data associated with the transaction, such as a transaction amount, merchant identifier, coupon data, random number, etc. Once the QR code 830 has been generated, the access device 120 may display the QR code 830 on the display 810 along with other prompts such as the total transaction amount and a request for the user to scan the generated QR code 830 with his/her communication device 110. Upon a successful scan of the QR 830 code by the user's communication device 110, the access device 120 may provide a prompt to the user. For example, the display 810 of the access device 120 may read, "Scan successful, waiting to scan communication device generated QR code." In some embodiments, the access device 120 may receive a notification from the communication device 110 when the communication device 110 successfully scans the access device 120 generated QR code 830. The notification may be received over any wireless transmission protocol including, but not limited to, NFC, Bluetooth, Wi-Fi, cellular, etc.

Figure 6B:
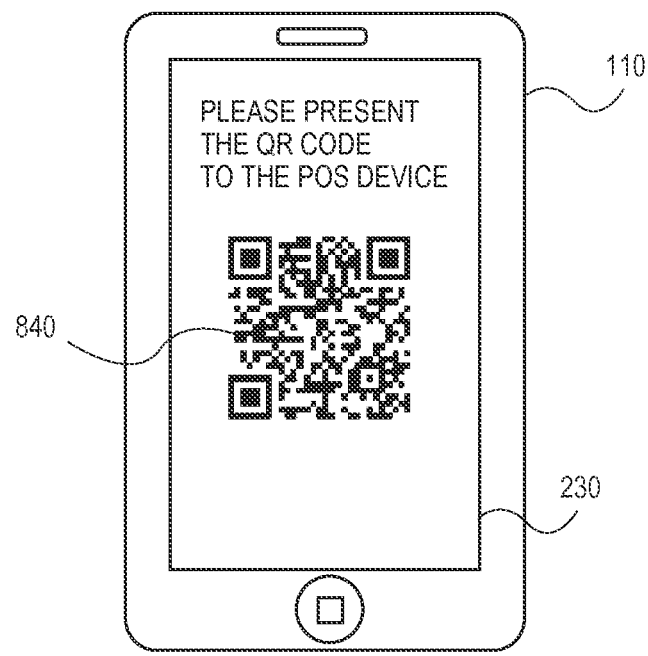
FIG. 6B shows a communication device displaying a QR code usable in a payment transaction, in accordance with some embodiments of the invention.

FIG. 6B shows a communication device 110 displaying a QR code 840 usable in a payment transaction, in accordance with some embodiments of the invention. The communication device 110 may include a display 230 configured to display the QR code 840 and various other prompts to the user. As described above with respect to steps s4 and s5 in FIG. 4, the access device 120 may generate a QR code encoding financial credentials associated with the user and a cryptogram, along with elements from the QR code generated by the access device 120, including but not limited to, the random number. Once the QR code 840 has been generated, the communication device 110 may display the QR code 840 on the display 230 along with other prompts such as a request for the user to present the generated QR code 840 to the access device 120 so that the access device may scan the generated QR code 840. For example, the display 820 of the communication device may read, "Please present the code to the POS device." In some embodiments, the communication device 110 may receive a notification from the access deice 120 when the access device 120 successfully scans the communication device 110 generated QR code 840. The notification may be received over any wireless transmission protocol including, but not limited to, NFC, Bluetooth, Wi-Fi, cellular, etc.

Figure 7:
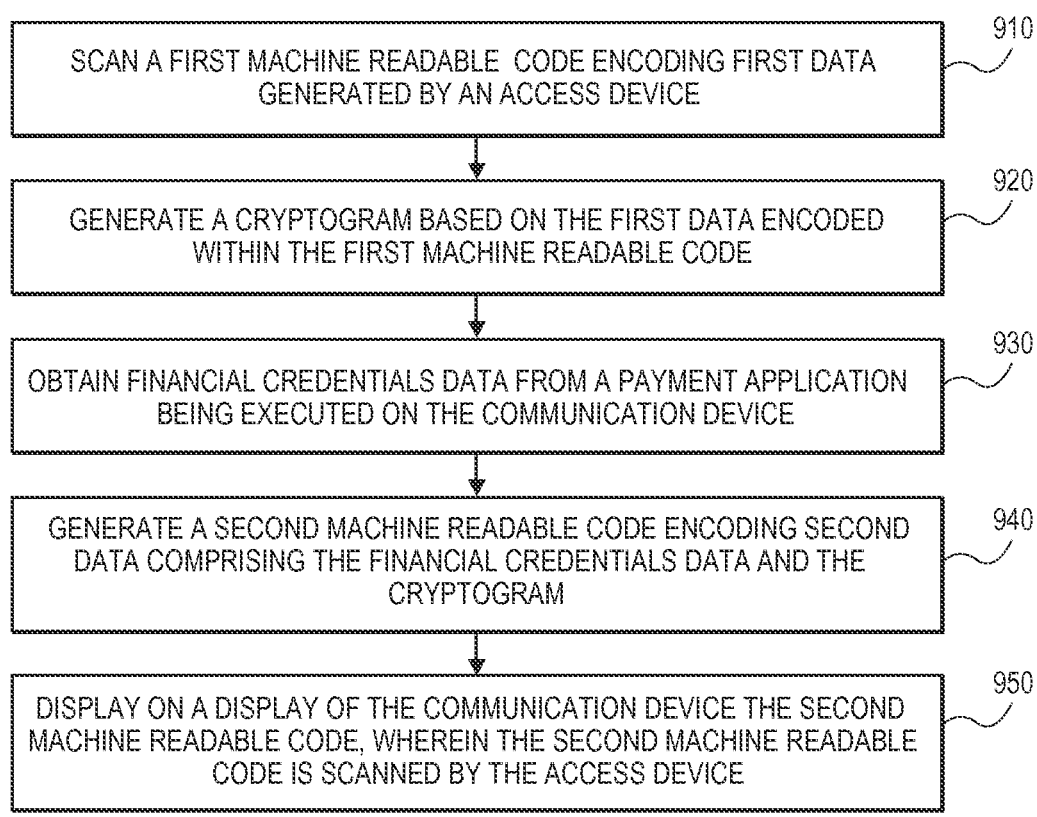
FIG. 7 shows a flowchart of an exemplary method of conducting a payment transaction using QR codes.

FIG. 7 shows a flowchart 900 of an exemplary method of conducting a payment transaction using QR codes. In block 910, a first machine readable code encoding first data generated by an access device is scanned. The first machine readable code may be a QR code. The first data may include, but is not limited to, at least one of a transaction amount, a random number, or coupon data. The first machine readable code may be displayed on a display of an access device. In some embodiments, the access device may be a POS device.

In block 920, after the first machine readable code is scanned, a cryptogram is generated based on the first data encoded within the first machine readable code. The cryptogram may be generated based on the various data encoded within the first machine readable code, including the random number. In some embodiments, the cryptogram may also be generated based on geolocation or timestamp data.

In block 930, after generating the cryptogram, financial credentials data is obtained from a payment application being executed on the communication device. In some embodiments, the payment application may be a digital wallet application. The financial credentials data may reside within a secure element on the communication device or within a cloud-based network. The payment application may interface with the secure element and/or cloud-based network to obtain the financial credentials associated with the user. Obtaining the financial credentials data may include communicating the first data encoded within the first machine readable code to the payment application. In some embodiments, the financial credentials data may include a token associated with a primary account number (PAN).

In block 940, after obtaining the financial credentials data, a second machine readable code is generated encoding second data comprising the financial credentials data and the cryptogram. In some embodiments, the second data may also include biometric data associated with the user. In some embodiments, the second machine readable code may be a QR code.

In block 950, after generating the second machine readable code, the second machine readable code is displayed on a display of the communication device, wherein the second machine readable code is scanned by the access device. Upon scanning the second machine readable code and authenticating the transaction, the access device may forward the transaction information to an issuer in the form of an authorization request message for traditional payment processing.

The QR code based system as discussed with different embodiments provides a platform that can be leveraged by external entities (e.g., third party wallets, e-commerce merchants, payment enablers/payment service providers, etc.) or internal payment processing network systems that have the need to use the QR codes to facilitate payment transactions. In embodiments of the invention, a QR can support interoperability and can be accepted, processed and routed by the entities within the payment system. Embodiments of the invention can help card issuers and merchants improve card security or enable new payment experiences through the use of QR codes.

The various participants and elements described herein with reference to FIGS. 1, 2, and 3 may operate one or more computer apparatuses to facilitate the functions described herein. Any of the elements in FIGS. 1, 2, and 3, including any servers or databases, may use any suitable number of subsystems to facilitate the functions described herein.

Figure 8:
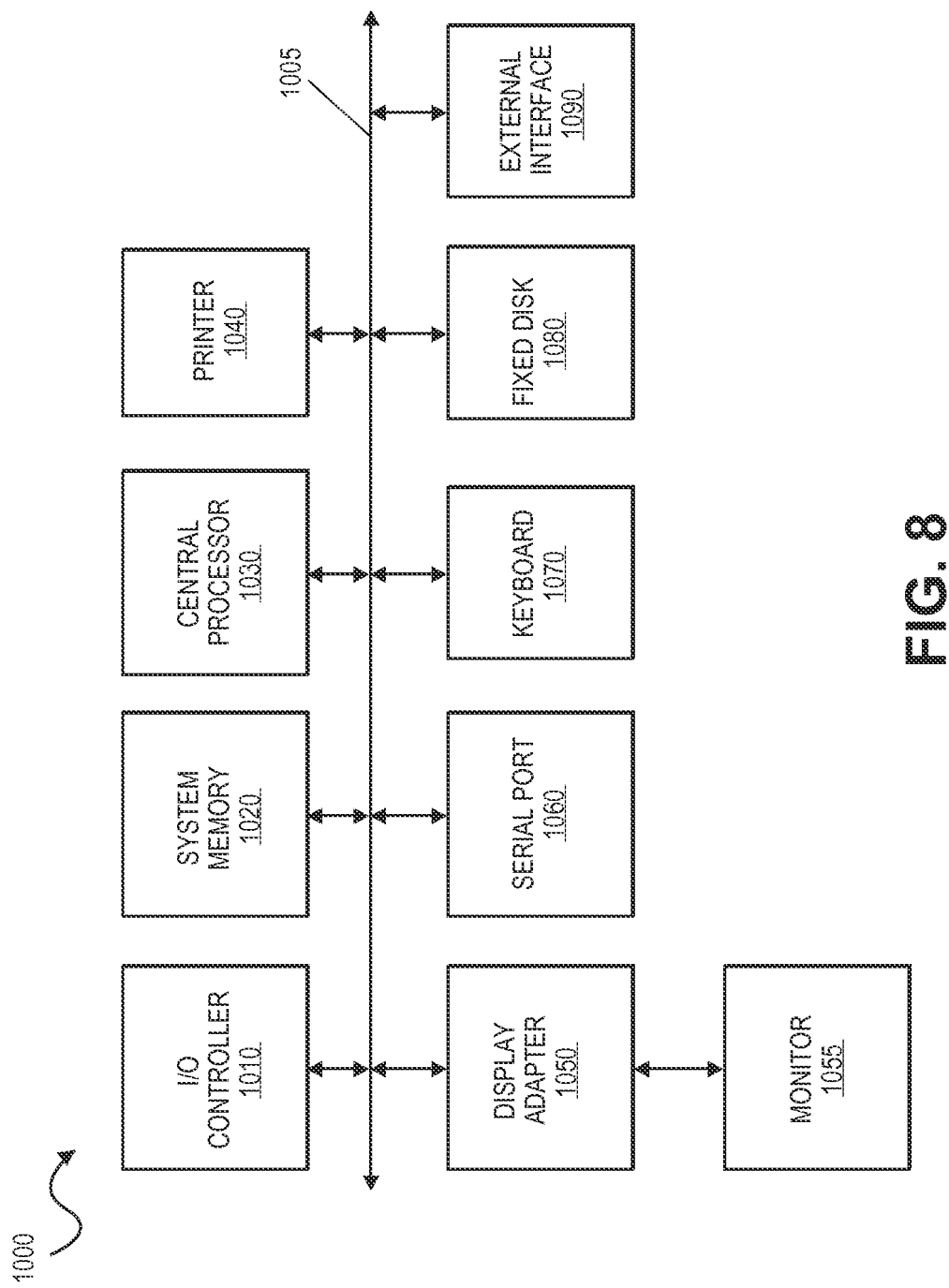
FIG. 8 shows a block diagram of a computer apparatus.

Examples of such subsystems or components are shown in FIG. 8. The subsystems shown in FIG. 8 are interconnected via a system bus 1010. Additional subsystems such as a printer 1030, keyboard 1018, fixed disk 1020 (or other memory comprising computer readable media), monitor 1012, which is coupled to display adapter 1014, and others are shown. Peripherals and input/output (I/O) devices, which couple to I/O controller 1024 (which can be a processor or other suitable controller), can be connected to the computer system by any number of means known in the art, such as serial port 1016. For example, serial port 1016 or external interface 1022 can be used to connect the computer apparatus to a wide area network such as the Internet, a mouse input device, or a scanner. The interconnection via system bus allows the central processor 1028 to communicate with each subsystem and to control the execution of instructions from system memory 1026 or the fixed disk 1020, as well as the exchange of information between subsystems. The system memory 1026 and/or the fixed disk 1020 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for facilitating a transaction, comprising:
generating by an access device, a first machine readable code encoding first data to form encoded information, wherein the first data comprises at least a random number unique to the transaction and a transaction amount for the transaction
displaying, by the access device to a communication device, the first machine readable code, wherein the communication device (i) scans the first machine readable code, (ii) decodes the encoded information to obtain the random number unique to the transaction and the transaction amount, (iii) generates a cryptogram by encrypting the random number, the transaction amount, a location associated with the communication device, and device specific information for the communication device with an encryption algorithm, (iv) obtains financial credentials from a payment application being executed on the communication device, (v) generates a second machine readable code encoding second data comprising the financial credentials and the cryptogram, and (vi) displays the second machine readable code;
scanning, by the access device, the second machine readable code;

decoding, by the access device, the second machine readable code to determine the second data comprising the financial credentials and the cryptogram;

generating, by the access device, an authorization request message including at least the financial credentials, the random number, and the cryptogram; and sending, by the access device, the authorization request message to an authorizing computer for authorization.

2. The method of claim 1 wherein the first data further comprises coupon data.

3. The method of claim 1, wherein the authorization request message further comprises a location of a merchant operating the access device.

4. The method of claim 1, wherein obtaining the financial credentials from the payment application comprises communicating the first data encoded within the first machine readable code to the payment application and obtaining the financial credentials from a secure element within the communication device.

5. The method of claim 1, wherein the financial credentials comprise a token, wherein the token is associated with a primary account number (PAN).

6. The method of claim 1, wherein obtaining the financial credentials comprises obtaining the financial credentials from a cloud-based network.

7. The method of claim 1, wherein the access device is a point-of-sale (POS) device.

8. The method of claim 1 wherein the payment application is a digital wallet application associated with a digital wallet provider.

9. The method of claim 1, wherein the communication device is a mobile phone.

10. The method of claim 9, wherein the second data further comprises biometric data associated with a user of the communication device.

11. An access device comprising a processor, and a computer readable medium coupled the processor, the computer readable medium comprising code, executable by the processor, for implementing a method comprising:

generating, a first machine readable code encoding first data to form encoded information, wherein the first data comprises at least a random number unique to a transaction and a transaction amount for the transaction, displaying, by the access device to a communication device, the first machine readable code, wherein the communication device (i) scans the first machine readable code, (ii) decodes the encoded information to obtain the random number unique to the transaction and the transaction amount, (iii) generates a cryptogram by encrypting the random number, the transaction amount, a location associated with the communication device, and device specific information for the communication device, (iv) obtains financial credentials from a payment application being executed on the communication device, (v) generates a second machine readable code encoding second data comprising the financial credentials and the cryptogram, and (vi) displays the second machine readable code;

scanning the second machine readable code;

decoding the second machine readable code to determine the second data comprising the financial credentials and the cryptogram;

generating an authorization request message including at least the financial credentials, the random number, and the cryptogram; and sending, by the access device, the authorization request message to an authorizing computer for authorization.

12. The access device of claim 11 wherein the first data further comprises coupon data.

13. The access device of claim 11, wherein the authorization request message further comprises a location of a merchant operating the access device.

14. The access device of claim 11, wherein obtaining the financial credentials from the payment application comprises communicating the first data encoded within the first machine readable code to the payment application and obtaining the financial credentials from a secure element within the communication device.

15. The access device of claim 11, wherein the financial credentials comprise a token, wherein the token is associated with a primary account number (PAN).

16. The access device of claim 11, wherein obtaining the financial credentials comprises obtaining the financial credentials from a cloud-based network.

17. The access device of claim 11, wherein the access device is a point-of-sale (POS) device.

18. The access device of claim 11 wherein the payment application is a digital wallet application associated with a digital wallet provider.

19. The access device of claim 11, wherein the communication device is a mobile phone.

20. The access device of claim 19, wherein the second data further comprises biometric data associated with a user of the communication device.

* * * * *